(12) United States Patent
Spurlock et al.

(10) Patent No.: US 10,339,099 B2
(45) Date of Patent: Jul. 2, 2019

(54) TECHNIQUES FOR LEVERAGING A BACKUP DATA SET FOR EDISCOVERY DATA STORAGE

(71) Applicant: Cobalt Iron, Inc., Lawrence, KS (US)

(72) Inventors: Richard R. Spurlock, Lawrence, KS (US); Robert M. Marett, Lawrence, KS (US); J. Mitchell Haile, Somerville, MA (US)

(73) Assignee: Cobalt Iron, Inc., Lawrence, KS (US)

( * ) Notice: Subject to any disclaimer, the term of this patent is extended or adjusted under 35 U.S.C. 154(b) by 623 days.

(21) Appl. No.: 14/631,509

(22) Filed: Feb. 25, 2015

(65) Prior Publication Data

US 2015/0242417 A1 Aug. 27, 2015

Related U.S. Application Data

(60) Provisional application No. 61/944,403, filed on Feb. 25, 2014.

(51) Int. Cl.
*G06F 17/00* (2019.01)
*G06F 7/00* (2006.01)
*G06F 16/11* (2019.01)
*G06F 16/22* (2019.01)

(52) U.S. Cl.
CPC ........ *G06F 16/122* (2019.01); *G06F 16/2228* (2019.01)

(58) Field of Classification Search
CPC .................... G06F 17/30082; G06F 17/30321

USPC ......................................................... 707/694
See application file for complete search history.

(56) References Cited

U.S. PATENT DOCUMENTS

| | | | | |
|---|---|---|---|---|
| 7,363,326 | B2* | 4/2008 | Margolus | G06F 16/2358 707/663 |
| 7,801,894 | B1* | 9/2010 | Bone | G06F 16/13 707/737 |
| 8,370,315 | B1* | 2/2013 | Efstathopoulos | G06F 16/2228 707/696 |
| 8,600,998 | B1* | 12/2013 | Chaudhary | G06F 16/122 707/741 |
| 8,943,356 | B1* | 1/2015 | Dutch | G06F 11/1469 714/6.1 |
| 9,183,205 | B1* | 11/2015 | Kurne | G06F 16/113 |
| 10,241,870 | B1* | 3/2019 | Beatty | G06F 11/1451 |
| 2009/0150168 | A1* | 6/2009 | Schmidt | G06Q 10/10 705/311 |

(Continued)

*Primary Examiner* — Pavan Mamillapalli
(74) *Attorney, Agent, or Firm* — Polsinelli PC

(57) ABSTRACT

Techniques for facilitating electronic discovery (eDiscovery) data storage in a backup environment are disclosed. In one particular embodiment, the technique(s) may be realized as a method of operating a computing system to facilitate electronic discovery (eDiscovery) data storage in a backup environment. The method may comprise storing, using electronic storage, a backup data set associated with an organization, processing, using at least one computer processor, the backup data set to extract metadata associated with data items in the backup data set, processing the metadata to identify a subset of the data items that are associated with eDiscovery, and generating an index of the metadata that identifies the subset of the data items in the electronic storage that are associated with the eDiscovery.

19 Claims, 3 Drawing Sheets

(56) References Cited

U.S. PATENT DOCUMENTS

| | | | |
|---|---|---|---|
| 2009/0150906 A1* | 6/2009 | Schmidt | G06Q 10/00 |
| | | | 719/317 |
| 2009/0292930 A1* | 11/2009 | Marano | G06F 21/6218 |
| | | | 713/189 |
| 2011/0004590 A1* | 1/2011 | Lilley | G06Q 10/06 |
| | | | 707/723 |
| 2011/0184910 A1* | 7/2011 | Love | G06F 16/2477 |
| | | | 707/610 |

* cited by examiner

TECHNIQUES FOR LEVERAGING A BACKUP DATA SET FOR EDISCOVERY DATA STORAGE

CROSS-REFERENCE TO RELATED APPLICATIONS

This patent application claims priority to U.S. Provisional Patent Application No. 61/944,403, filed Feb. 25, 2014, which is hereby incorporated by reference herein in its entirety.

FIELD OF THE DISCLOSURE

The present disclosure relates generally to backup data and, more particularly, to techniques for leveraging backup data for eDiscovery.

BACKGROUND OF THE DISCLOSURE

Electronic discovery (eDiscovery) may require quick and complete responses to requests for data as well as production of data that follows one or more rules for data production. Backup data sets may be large and the number of backup data sets may be large as well. Identifying and accessing backup data which is responsive to an eDiscovery need in a timely manner and doing so in a way that complies with one or more rules for data production may be a significant challenge. Additionally, producing responsive data from one or more backup sets while controlling access to privileged data, confidential data, and data subject to restrictions from a third party (e.g., third party confidential data) may present additional eDiscovery challenges.

In view of the foregoing, it may be understood that there may be significant problems and shortcomings associated with current technologies for accessing eDiscovery data in backup data sets.

SUMMARY OF THE DISCLOSURE

Techniques for facilitating electronic discovery (eDiscovery) data storage in a backup environment are disclosed. In one particular embodiment, the techniques may be realized as a method of operating a computing system to facilitate electronic discovery (eDiscovery) data storage in a backup environment. The method may comprise storing, using electronic storage, a backup data set associated with an organization, processing, using at least one computer processor, the backup data set to extract metadata associated with data items in the backup data set, processing the metadata to identify a subset of the data items that are associated with eDiscovery, and generating an index of the metadata that identifies the subset of the data items in the electronic storage that are associated with the eDiscovery.

In accordance with other aspects of this particular embodiment, the techniques may include receiving an eDiscovery request, wherein the eDiscovery request comprises one or more eDiscovery selection criteria.

In accordance with further aspects of this particular embodiment, the one or more eDiscovery selection criteria may comprise at least one of: a keyword, an author, a recipient, a date range, a subject, a filename, a file type, a data source, a date of last modification, a creation date, a department, an attachment type, an owner of data, a category, a phrase, a custodian of data, a privilege level, a confidentiality level, an indication of proprietary data, an indication of classified data, and an indication of third party confidential data.

In accordance with additional aspects of this particular embodiment, the metadata may comprise one or more of: a keyword, an author, a recipient, a date range, a subject, a filename, a file type, a data source, a date of last modification, a creation date, a department, an attachment type, an owner of data, a category, a phrase, a custodian of data, a privilege level, a confidentiality level, an indication of proprietary data, an indication of classified data, and an indication of third party confidential data.

In accordance with other aspects of this particular embodiment, processing the metadata to identify a subset of the data items that are associated with eDiscovery may comprise comparing the identified metadata with one or more eDiscovery criteria.

In accordance with further aspects of this particular embodiment, identification of the subset of the data items that are associated with the eDiscovery may be performed in accordance with at least one of: an eDiscovery policy and a backup policy.

In accordance with additional aspects of this particular embodiment, the subset of the data items that are associated with the eDiscovery may be retained in accordance with an eDiscovery policy.

In accordance with other aspects of this particular embodiment, the retention may preserve a chain of custody of the subset of the data items that are associated with the eDiscovery.

In accordance with further aspects of this particular embodiment, the retention may preserve a native file format of the subset of the data items that are associated with the eDiscovery.

In accordance with additional aspects of this particular embodiment, the subset of the data items that are associated with the eDiscovery may be retained unmodified in the backup data set.

In accordance with other aspects of this particular embodiment, the techniques may include detecting that the backup data set is going to be modified, and copying the subset of the data items that are associated with the eDiscovery prior to the modification in accordance with an eDiscovery policy.

In accordance with further aspects of this particular embodiment, the techniques may include detecting that the backup data set is going to be modified, and preventing modification to at least the portion of the backup data set including the subset of the data items that are associated with the eDiscovery in accordance with an eDiscovery policy.

In accordance with other aspects of this particular embodiment, the detected modification may comprise a scheduled expiration of the backup data set.

In accordance with further aspects of this particular embodiment, the techniques may comprise extracting one or more portions of the subset of the data items that are associated with the eDiscovery.

In accordance with additional aspects of this particular embodiment, the metadata index may be stored as part of the backup data.

In accordance with other aspects of this particular embodiment, the metadata index may be stored separately from the backup data.

In accordance with further aspects of this particular embodiment, the metadata index may facilitate rendering of a view in a graphical user interface of the subset of the data items that are associated with the eDiscovery.

In accordance with additional aspects of this particular embodiment, an eDiscovery policy may provide handling of the subset of the data items that are associated with the eDiscovery to ensure compliance with a rule for at least one of: retention, extraction, expiration, chain of custody, privilege, third party data requirements, and confidentiality.

In another particular embodiment, the techniques may be realized as an apparatus for facilitating electronic discovery (eDiscovery) data storage in a backup environment. The apparatus may comprising electronic storage and at least one computer processor coupled to the electronic storage. The at least one computer processor may be configured to store, using the electronic storage, a backup data set associated with an organization, process the backup data set to extract metadata associated with data items in the backup data set, process the metadata to identify a subset of the data items that are associated with eDiscovery, and generate an index of the metadata that identifies the subset of the data items in the electronic storage that are associated with the eDiscovery.

In yet another particular embodiment, the techniques may be realized as a system for facilitating electronic discovery (eDiscovery) data storage in a backup environment. The system may comprise one or more computer processors communicatively coupled to a network. The one or more processors may be configured to store, using electronic storage, a backup data set associated with an organization, process the backup data set to extract metadata associated with data items in the backup data set, process the metadata to identify a subset of the data items that are associated with eDiscovery, and generate an index of the metadata that identifies the subset of the data items in the electronic storage that are associated with the eDiscovery.

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Disclosed herein are systems, methods, and software to facilitate electronic discovery (eDiscovery) data storage in a backup environment. In one exemplary technique, a computing system may be configured to interrogate backup and archive data sets, extract metadata, identify the desired data, and build a metadata index. In some implementations, the computing system may optionally extract the identified data from the backup and archive environment and store the extracted data for a policy-determined period of time. By storing the data and metadata index back in the backup and archive environment, any deduplication and compression features of the backup data set may be leveraged. Additionally, this also effectively splits the eDiscovery data set from the backup data set, allowing the backup data to be expired independent of the eDiscovery policies and managed data. In some examples, the computing system may support both unstructured data such as file systems and structured data such as email and database content, thereby enabling search.

Figure 1:
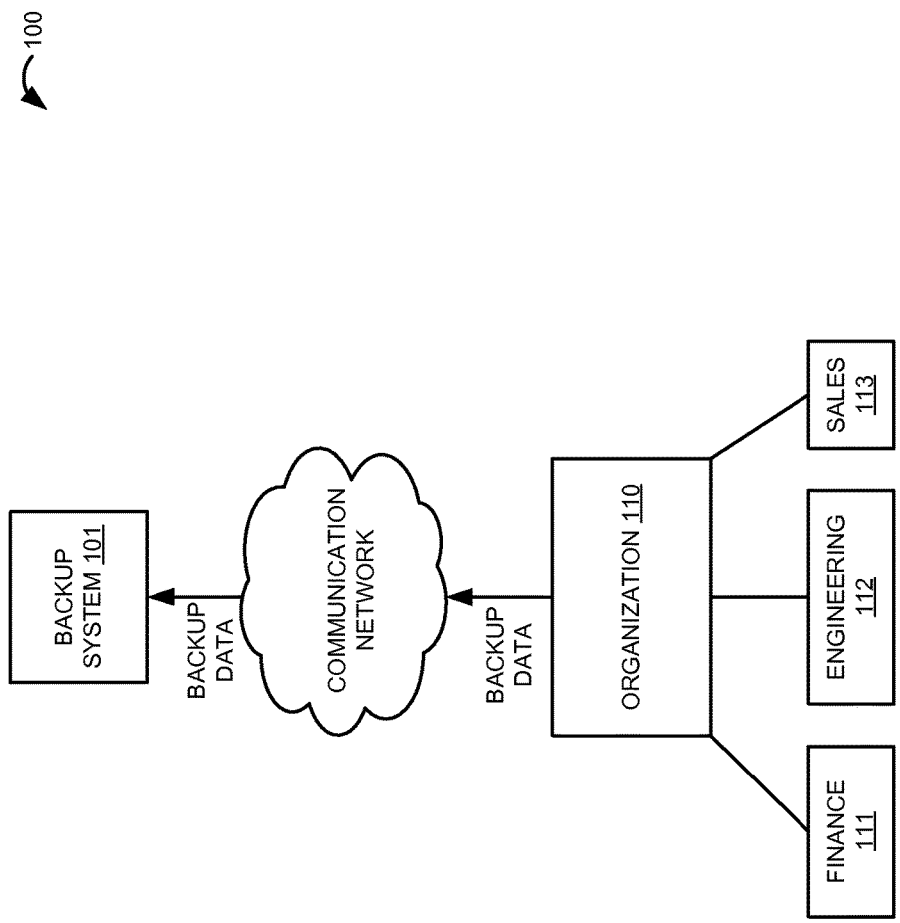
FIG. 1 illustrates an implementation of a backup system in accordance with an embodiment of the present disclosure.

FIG. 1 illustrates an exemplary implementation of a backup communication system 100. Backup communication system 100 includes backup system 101 and organization 110. Backup system 101 typically includes a storage system for storing backup data, which could include a large storage array of drives, network attached storage (NAS), server racks, and other equipment. Organization 110 includes sub-organizations of finance 111, engineering 112, and sales 113. Note that in this example, the sub-organizations are defined by various departments of organization 110, but the sub-organizations of organization 110 could be defined differently in other examples, such as by different subsidiaries, regional offices, or any other possible way of subdividing an organization. In some embodiments, extraction of metadata and/or identification of eDiscovery data may be distributed across a plurality of suborganizations. In some embodiments, one or more centralized processes may be capable of extracting metadata and/or identifying eDiscovery data across one or a plurality of suborganizations.

Organization 110 typically generates data in the course of conducting operations and transmits this data via a communication network for backup storage in backup system 101. The communication network shown in FIG. 1 is representative of any communication link, system, or network, including a local area network (LAN), wide area network (WAN), wireless network, or any other system capable of communicating data—including combinations thereof. Thus, in some examples, backup system 101 could comprise a computing system operating locally within organization 110, a backup service operated remotely from organization 110, or any other backup arrangement.

During the course of conducting business, organization 110 may occasionally become party to a civil litigation. Pursuant to the litigation, organization 110 is typically required to produce electronic documents and other data pursuant to an electronic discovery (eDiscovery) request. Some of this eDiscovery data may require special handling and storage accommodations depending on eDiscovery rules and policies. One exemplary technique to facilitate eDiscovery data storage will now be described with respect to FIG. 2.

Figure 2:
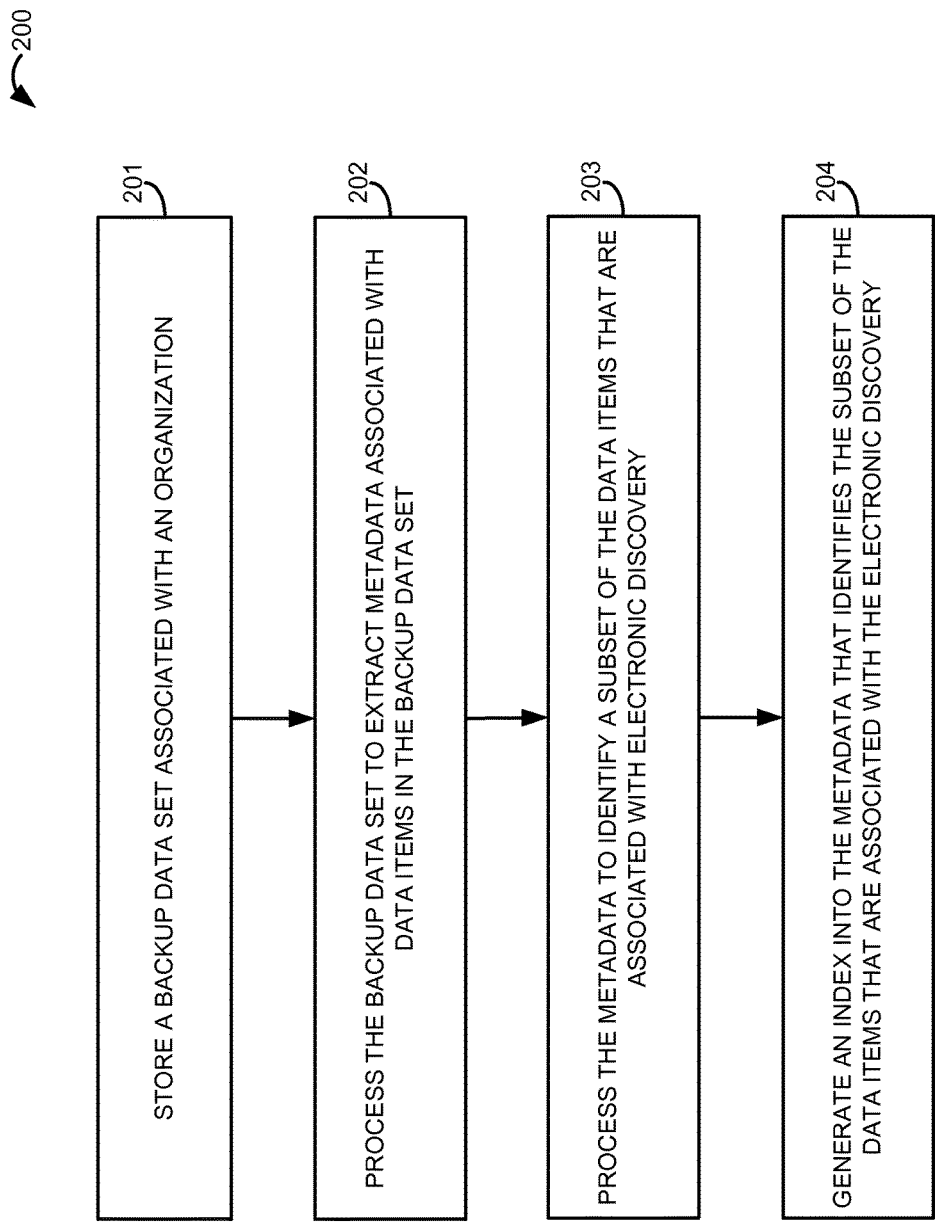
FIG. 2 is a flow chart illustrating a process of leveraging backup data for eDiscovery in accordance with an embodiment of the present disclosure.

In operation, and with respect to eDiscovery storage process 200 of FIG. 2, backup system 101 stores a backup data set associated with organization 110 (Step 201). In some examples, the backup data set could be stored in a local storage system of organization 110, remote storage system, cloud storage, and other systems. Backup system 101 may perform a backup service for organization 110 in some implementations. For example, to perform the backup service, backup system 101 may deploy a backup client (not shown) to organization 110, which could then collect data that organization 110 wants to backup and transfer this backup data set for delivery to backup system 101 via a communication network. In some embodiments, backup storage and/or eDiscovery analysis and processing of backup data may be cloud based and/or distributed. In some embodiments, backup system 101 may be capable of eDiscovery analysis and processing of backup data across a plurality of organizations in response to a single discovery request (e.g., sub-organizations of a single parent, divisions, offices, etc.).

Regardless of how and where the backup data set gets stored, once backup system 101 has access to the backup data, backup system 101 may process the backup data set to extract metadata associated with data items in the backup data set (Step 202). In some embodiments, metadata may be generated as data is backed up. Data items could comprise any data stored in the backup data set, including structured data such as files, email, and database records and unstructured data such as file systems. The metadata extracted by backup system 101 typically includes any data associated with a data item, such as a filename, file type, data source, date and time of last modification, department, and any other information. In one or more embodiments, a history of data may be maintained allowing for the documentation and generation of a chain of custody for any eDiscovery related data. For example, creation date and time of data may be tracked and/or any modifications to data (or associated metadata) may also be tracked by date/time. Creation and modification authors and/or operators may also be tracked.

Once the metadata is extracted, backup system 101 processes the metadata to identify a subset of the data items that are associated with electronic discovery (Step 203). Typically, backup system 101 may identify the metadata with a list of keywords, categories, phrases, relevant time periods, and other search terms that are associated with discoverable documents in order to identify the subset of the data items that are associated with an eDiscovery request. By comparing the metadata with eDiscovery search terms, backup system 101 may be able to quickly identify data items having metadata that are associated with an eDiscovery request. Although depicted as a single system, backup system 101 may be a plurality of systems which may be at a common location or distributed. Storage of backup data may also be distributed. Extraction of metadata and/or identification of data associated with metadata may further be distributed.

Finally, backup system 101 generates an index into the metadata that identifies the subset of the data items that are associated with the electronic discovery (Step 204). By building the metadata index, backup system 101 effectively creates a logical layer over the data set that provides a view into what portions of the backup data set are associated with eDiscovery. The metadata index can then be stored by backup system 101 along with the backup data set, and backup system 101 can use the metadata index as a map to identify the eDiscovery data in the backup data set. In some embodiments, the metadata index may be stored separately from the backup data set. Optionally, backup system 101 may extract the identified eDiscovery data from the backup data set in some examples. Backup system 101 could then store the extracted eDiscovery data separately from the backup data set for a policy-determined period of time. However, note that indexing the metadata to facilitate identification of the eDiscovery data may effectively split the eDiscovery data set from the backup data set, allowing the backup data to be expired independent of any eDiscovery data lifespan policies. For example, identified eDiscovery data may remain stored as part of a backup set in which it was originally identified. This may reduce a need for additional storage for eDiscovery data. However, identified eDiscovery data may be retained under a separate timeframe from backup data (e.g., eDiscovery data retention may be controlled by an eDiscovery policy and backup data retention may be controlled by a backup data policy). If backup data is to be modified (e.g., expired or archived), identified eDiscovery data may be copied to a separate location prior to modification of the backup data. In some embodiments, an eDiscovery policy may prevent deletion and/or modification of one or more portions of backup data identified as eDiscovery data. In one or more embodiments, prior to deletion and/or modification of any backup data, all eDiscovery requests may be completed, thus ensuring that the backup data has been analyzed to identify and preserve eDiscovery data. In some embodiments, if eDiscovery data expires prior to expiration of a backup, a metadata index associated with the backup data may be deleted. Deduplication and compression features of the backup data set may also be leveraged, providing storage optimization and increased efficiency.

Figure 3:
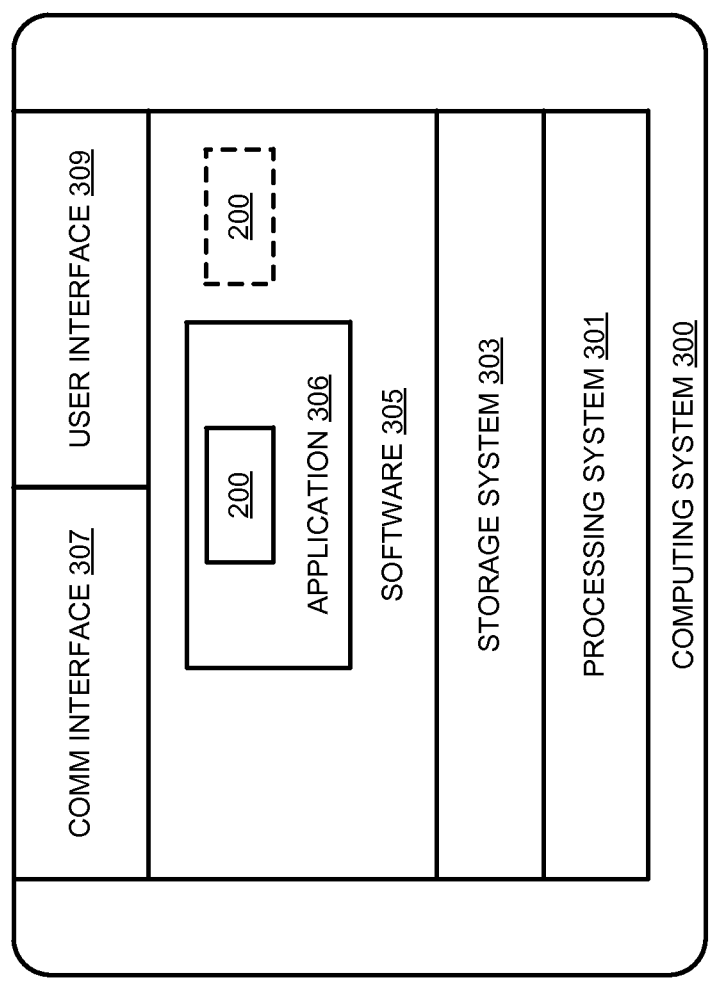
FIG. 3 is a block diagram that illustrates a computing system in accordance with an embodiment of the present disclosure.

FIG. 3 is a block diagram that illustrates computing system 300 in an exemplary implementation. Computing system 300 provides an example of backup system 101, although system 101 could use alternative configurations. Computing system 300 includes processing system 301, storage system 303, software 305, communication interface 307, and user interface 309. Software 305 includes application 306 which itself may include eDiscovery storage process 200. Note that eDiscovery storage process 200 may optionally be implemented separately from application 306, as shown by the dashed line around the version of process 200 shown external to application 306.

Computing system 300 may be representative of any computing apparatus, system, or systems on which application 306 and eDiscovery storage process 200 or variations thereof may be suitably implemented. Examples of computing system 300 include mobile computing devices, such as cell phones, tablet computers, laptop computers, notebook computers, and gaming devices, as well as any other type of mobile computing devices and any combination or variation thereof. Note that the features and functionality of computing system 300 may apply as well to desktop computers, server computers, and virtual machines, as well as any other type of computing system, variation, or combination thereof.

As mentioned above, computing system 300 includes processing system 301, storage system 303, software 305, communication interface 307, and user interface 309. Processing system 301 is operatively coupled with storage system 303, communication interface 307, and user interface 309. Processing system 301 loads and executes software 305 from storage system 303. When executed by computing system 300 in general, and processing system 301 in particular, software 305 directs computing system 300 to operate as described herein for eDiscovery storage process 200 or variations thereof. Computing system 300 may optionally include additional devices, features, or functionality not discussed herein for purposes of brevity. Computing system 300, although depicted as a single system, may be a plurality of distributed systems, a cloud based system, and/or a virtual system. In some embodiments, one or more portions of functionality may be performed at a client device and/or at one or more central locations. For example, depending on an amount of data to be analyzed, a location of data, a timeframe, policy, or other factors, one or more virtual servers may be used to extract metadata and/or identify eDiscovery data. An eDiscovery request may contain factors (e.g., relevant organizations, authors, time periods, etc.) that may be an influence on distribution of extraction of metadata and identification of eDiscovery data.

Referring still to FIG. 3, processing system 301 may comprise a microprocessor and other circuitry that retrieves and executes software 305 from storage system 303. Processing system 301 may be implemented within a single processing device but may also be distributed across multiple processing devices or sub-systems that cooperate in executing program instructions. Examples of processing system 301 include general purpose central processing units, application specific processors, and logic devices, as well as any other type of processing device, combinations, or variations thereof.

Storage system 303 may comprise any computer-readable media or storage media readable by processing system 301 and capable of storing software 305. Storage system 303 may include volatile and nonvolatile, removable and non-removable media implemented in any method or technology for storage of information, such as computer readable instructions, data structures, program modules, or other data. Storage system 303 may be implemented as a single storage device but may also be implemented across multiple storage devices or sub-systems co-located or distributed relative to each other. Storage system 303 may comprise additional elements, such as a controller, capable of communicating with processing system 301. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

In operation, in conjunction with user interface 309, processing system 301 loads and executes portions of software 305, such as eDiscovery storage process 200, to operate as described herein. Software 305 may be implemented in program instructions and among other functions may, when executed by computing system 300 in general or processing system 301 in particular, direct computing system 300 or processing system 301 to store a backup data set associated with an organization, process the backup data set to extract metadata associated with data items in the backup data set, process the metadata to identify a subset of the data items that are associated with electronic discovery, and generate an index into the metadata that identifies the subset of the data items that are associated with the electronic discovery.

Software 305 may include additional processes, programs, or components, such as operating system software or other application software. Examples of operating systems include Windows®, iOS®, and Android®, as well as any other suitable operating system. Software 305 may also comprise firmware or some other form of machine-readable processing instructions executable by processing system 301. In general, software 305 may, when loaded into processing system 301 and executed, transform computing system 300 overall from a general-purpose computing system into a special-purpose computing system customized to facilitate eDiscovery data storage in a backup environment as described herein for each implementation.

Communication interface 307 may include communication connections and devices that allow for communication between computing system 300 and other computing systems (not shown) or services, over a communication network or collection of networks. Examples of connections and devices that together allow for inter-system communication may include network interface cards, antennas, power amplifiers, radio frequency (RF) circuitry, transceivers, and other communication circuitry. The aforementioned network, connections, and devices are well known and need not be discussed at length here.

User interface 309 may include a voice input device, a touch input device for receiving a gesture from a user, a motion input device for detecting non-touch gestures and other motions by a user, and other comparable input devices and associated processing elements capable of receiving user input from a user. Output devices such as a display system, speakers, haptic devices, and other types of output devices may also be included in user interface 309. The aforementioned user input devices are well known in the art and need not be discussed at length here. User interface 309 may also include associated user interface software executable by processing system 301 in support of the various user input and output devices discussed above. Separately or in conjunction with each other and other hardware and software elements, the user interface software and devices may provide a graphical user interface, a natural user interface, or any other kind of user interface. User interface 309 may be omitted in some examples.

In some embodiments, user interface 309 may include a graphical user interface. A graphical user interface may provide functionality for one or more users of a backup system, an archive system, a replication system, and/or an eDiscovery system leveraging backed up, archived, replicated or other stored data. For example, a user interface may use a metadata index to render a view displaying one or more backup data items associated with an eDiscovery request. A user interface may allow entry of one or more eDiscovery criteria to identify and/or change a scope of identified eDiscovery data. A user interface may also provide data entry fields, drop down boxes, combo boxes, spinners, menus and/or other user interface controls to enter eDiscovery selection or exclusion criteria. In some embodiments, eDiscovery selection or exclusion criteria may include, for example, a keyword, an author, a recipient, a date range, a subject, a filename, a file type, a data source, a date of last modification, a creation date, a department, an attachment type, an owner of data, a category, a phrase, a custodian of data, a privilege level, a confidentiality level, an indication of proprietary data, an indication of classified data, and an indication of third party confidential data. User interface 309 may facilitate the creation of one or more reports, policies, or other items. In some embodiments, policies may be templates based in part on one or more rules for eDiscovery (e.g., the Federal Rules of Civil Procedure, state guidelines, local jurisdiction guidelines, best practices, case-specific stipulations, etc.). eDiscovery policies may enforce one or more rules associated with actions such as, for example, extraction of eDiscovery associated data, expiration of eDiscovery associated data, handling of eDiscovery associated data, etc.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

At this point it should be noted that leveraging backup data, archive data, or other stored data for eDiscovery in accordance with the present disclosure as described above may involve the processing of input data and the generation of output data to some extent. This input data processing and output data generation may be implemented in hardware or software. For example, specific electronic components may be employed in a backup server, eDiscovery server, archive server, dedicated processor or similar or related circuitry for implementing the functions associated with leveraging backup data for eDiscovery in accordance with the present disclosure as described above. Alternatively, one or more processors operating in accordance with instructions may implement the functions associated with leveraging backup data for eDiscovery in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

The invention claimed is:

1. A method of operating a computing system to facilitate electronic discovery (eDiscovery) data storage in a backup environment, the method comprising:
 deploying, using at least one computer processor, a backup client having a graphical user interface to a computing device associated with an organization having at least one sub-organization;
 receiving from the computing device associated with the organization, using the at least one computer processor, an eDiscovery request comprising at least one eDiscovery selection criterion input to the graphical user interface;
 receiving, using the at least one computer processor, a backup data set comprising structured data and unstructured data from a plurality of computing devices associated with the organization and storing the backup data set associated with the organization in at least one of a local storage system of the computing device associated with the organization, a remote storage system, and cloud storage;
 processing, using the at least one computer processor, the backup data set to extract metadata associated with data items in the backup data set;
 processing, using the at least one computer processor, the metadata to identify a subset of the data items that are associated with eDiscovery and performing deduplication and compression on the subset of the data items to optimize storage and increase efficiency in at least one of a local storage system of the computing device associated with the organization, a remote storage system, and cloud storage;
 generating, using the at least one computer processor, an index of the metadata that identifies the subset of the data items that are associated with the eDiscovery and transmitting a view based on the index of the metadata to the computing device associated with the organization to display the subset of the data items associated with the eDiscovery request using the graphical user interface; and
 preserving, using the at least one computer processor, a native file format for each data item in the subset of data items and a chain of custody for each data item in the subset of data items, wherein the chain of custody for each respective data item includes one or more times when the respective data item was created or modified, and one or more authors that created or modified the respective data item.

2. The method of claim 1, wherein the at least one eDiscovery selection criterion comprises at least one of: a keyword, an author, a recipient, a date range, a subject, a filename, a file type, a data source, a date of last modification, a creation date, a department, an attachment type, an owner of data, a category, a phrase, a custodian of data, a privilege level, a confidentiality level, an indication of proprietary data, an indication of classified data, and an indication of third party confidential data.

3. The method of claim 1, wherein the metadata comprise one or more of: a keyword, an author, a recipient, a date range, a subject, a filename, a file type, a data source, a date of last modification, a creation date, a department, an attachment type, an owner of data, a category, a phrase, a custodian of data, a privilege level, a confidentiality level, an indication of proprietary data, an indication of classified data, and an indication of third party confidential data.

4. The method of claim 1, wherein processing the metadata to identify a subset of the data items that are associated with eDiscovery further comprises:
 comparing the identified metadata with one or more eDiscovery criteria.

5. The method of claim 1, wherein identification of the subset of the data items that are associated with the eDiscovery is performed in accordance with at least one of: an eDiscovery policy and a backup policy.

6. The method of claim 1, wherein the subset of the data items that are associated with the eDiscovery are retained in accordance with an eDiscovery policy.

7. The method of claim 1, wherein the subset of the data items that are associated with the eDiscovery are retained unmodified in the backup data set.

8. The method of claim 7, further comprising:
 detecting that the backup data set is going to be modified; and
 copying the subset of the data items that are associated with the eDiscovery prior to the modification in accordance with an eDiscovery policy.

9. The method of claim 8, wherein the detected modification comprises a scheduled expiration of the backup data set.

10. The method of claim 7, further comprising:
   detecting that the backup data set is going to be modified; and
   preventing modification to at least the portion of the backup data set including the subset of the data items that are associated with the eDiscovery in accordance with an eDiscovery policy.

11. The method of claim 1, further comprising extracting one or more portions of the subset of the data items that are associated with the eDiscovery.

12. The method of claim 1, wherein the metadata index is stored as part of the backup data.

13. The method of claim 1, wherein the metadata index is stored separately from the backup data.

14. The method of claim 1, wherein an eDiscovery policy provides handling of the subset of the data items that are associated with the eDiscovery to ensure compliance with a rule for at least one of: retention, extraction, expiration, chain of custody, privilege, third party data requirements, and confidentiality.

15. The method of claim 1, further comprising processing the backup data set to extract metadata associated with the data items in the backup set when storing the backup data set associated with an organization.

16. An apparatus for facilitating electronic discovery (eDiscovery) data storage in a backup environment, the apparatus comprising:
   memory; and
   at least one computer processor coupled to the memory to:
   deploy a backup client having a graphical user interface to a computing device associated with an organization having at least one sub-organization;
   receive from the computing device associated with the organization an eDiscovery request comprising at least one eDiscovery selection criterion input to the graphical user interface;
   receive a backup data set comprising structured data and unstructured data from a plurality of computing devices associated with the organization and store, the backup data set associated with the organization in at least one of a local storage system of the computing device associated with the organization, a remote storage system, and cloud storage;
   process the backup data set to extract metadata associated with data items in the backup data set;
   process the metadata to identify a subset of the data items that are associated with eDiscovery and perform deduplication and compression on the subset of the data items to optimize storage and increase efficiency in at least one of a local storage system of the computing device associated with the organization, a remote storage system, and cloud storage;
   generate an index of the metadata that identifies the subset of the data items that are associated with the eDiscovery and transmit a view based on the index of the metadata to the computing device associated with the organization to display the subset of the data items associated with the eDiscovery request using the graphical user interface; and
   preserve a native file format for each data item in the subset of data items and a chain of custody for each data item in the subset of data items, wherein the chain of custody for each respective data item includes one or more times when the respective data item was created or modified, and one or more authors that created or modified the respective data item.

17. The apparatus of claim 16, the at least one processor coupled to the memory further to process the backup data set to extract metadata associated with the data items in the backup set when storing the backup data set associated with an organization.

18. A system for facilitating electronic discovery (eDiscovery) data storage in a backup environment comprising:
   a non-transitory computer-readable storage medium comprising instructions stored thereon that, when executed by a computing device cause the computing device to perform operations, the operations comprising:
   deploying a backup client having a graphical user interface to a computing device associated with an organization having at least one sub-organization;
   receiving from the computing device associated with the organization an eDiscovery request comprising at least one eDiscovery selection criterion input to the graphical user interface;
   receiving a backup data set comprising structured data and unstructured data from a plurality of computing devices associated with the organization and storing the backup data set associated with the organization in at least one of a local storage system of the computing device associated with the organization, a remote storage system, and cloud storage;
   processing the backup data set to extract metadata associated with data items in the backup data set;
   processing the metadata to identify a subset of the data items that are associated with eDiscovery and performing deduplication and compression on the subset of the data items to optimize storage and increase efficiency in at least one of a local storage system of the computing device associated with the organization, a remote storage system, and cloud storage;
   generating an index of the metadata that identifies the subset of the data items that are associated with the eDiscovery and transmitting a view based on the index of the metadata to the computing device associated with the organization to display the subset of the data items associated with the eDiscovery request using the graphical user interface; and
   preserving a native file format for each data item in the subset of data items and a chain of custody for each data item in the subset of data items, wherein the chain of custody for each respective data item includes one or more times at which the respective data item was created or modified, and one or more authors that created or modified the respective data item.

19. The system of claim 18, the operations further comprising processing the backup data set to extract metadata associated with the data items in the backup set when storing the backup data set associated with an organization.

* * * * *